United States Patent [19]

D'Amato

[11] Patent Number: 5,393,099
[45] Date of Patent: Feb. 28, 1995

[54] ANTI-COUNTERFEITING LAMINATED CURRENCY AND METHOD OF MAKING THE SAME

[75] Inventor: Salvatore F. D'Amato, Monmouth Beach, N.J.

[73] Assignee: American Bank Note Holographics, Inc., Elmsford, N.Y.

[21] Appl. No.: 65,535

[22] Filed: May 21, 1993

[51] Int. Cl.⁶ .................. B42D 15/10; B32B 23/06
[52] U.S. Cl. .......................... 283/91; 283/57; 283/67; 283/86; 283/94; 283/107; 283/901; 428/537.5
[58] Field of Search ............ 283/86, 91, 94, 101, 283/57–59, 67, 98, 901, 107; 156/209, 251; 428/511, 537.5

[56] References Cited

U.S. PATENT DOCUMENTS

| | | | |
|---|---|---|---|
| 3,092,402 | 6/1963 | Reed | 283/57 |
| 4,044,231 | 8/1977 | Beck et al. | 235/61.12 |
| 4,247,318 | 1/1981 | Lee et al. | 156/163 |
| 4,472,627 | 9/1984 | Weinberger | 235/487 |
| 4,507,349 | 3/1985 | Fromson et al. | 428/195 |
| 4,652,015 | 3/1987 | Crane | 283/58 X |
| 4,778,713 | 10/1988 | Akao | 428/537.5 X |
| 4,820,570 | 4/1989 | Hasegawa et al. | 156/251 X |
| 5,141,916 | 8/1992 | Katayama et al. | 428/511 |
| 5,281,474 | 1/1994 | Matsusaki et al. | 283/94 X |
| 5,296,307 | 3/1994 | Bernstein | 156/209 |

FOREIGN PATENT DOCUMENTS

| | | | |
|---|---|---|---|
| 488652 | 4/1976 | Australia. | |
| 116193 | 8/1984 | European Pat. Off. | 428/511 |
| 0374763 | 6/1990 | European Pat. Off. | 283/57 |
| 37184 | 2/1987 | Japan | 428/537.5 |
| 8900896 | 11/1990 | Netherlands | 283/57 |

OTHER PUBLICATIONS

R.B. Godlewski; Safety Paper; Apr. 1973; vol. 15, No. 11.

*Primary Examiner*—Peter Dungba Vo
*Attorney, Agent, or Firm*—Longacre & White

[57] ABSTRACT

The present invention pertains to a method of producing an anti-counterfeiting document or currency which acts and feels like existing paper currencies. The method of the present invention laminates two sheets of currency paper on each side of a thin durable substrate film, thereby forming a durable document which maintains a paper-like feel. The currency of the present invention exhibits unique and powerful anti-counterfeiting features compared to those presently available. The currency of the instant invention also lasts significantly longer than conventional "paper" money.

25 Claims, 1 Drawing Sheet

ANTI-COUNTERFEITING LAMINATED CURRENCY AND METHOD OF MAKING THE SAME

BACKGROUND OF THE INVENTION

A) Field of the Invention

The present invention pertains to a method of producing an anti-counterfeiting document or currency which acts and feels like existing paper currencies. The method of the present invention laminates two sheets of currency paper on each side of a thin durable substrate, thereby forming a durable document which maintains a paper-like feel. The currency of the present invention exhibits unique and powerful anti-counterfeiting features compared to those presently available. The currency of the instant invention also lasts significantly longer than conventional "paper" money.

b) Description of Related Art

Throughout the world, existing paper currency is in jeopardy because available color copiers and offset equipment allow the amateur counterfeiter to become a criminal of "opportunity" and the professional counterfeiter to create a fake currency which will pass for authentic except under the most stringent or rigorous of inspections.

Most central banks are reluctant to make major changes in currency for fear of alienating a populace, who for all of their lives, have generally known only one piece of paper which has monetary value. Therefore, the central banks are in the non-enviable position of desiring to keep the look and feel of their traditional currency, while also needing to offer a currency which defeats the counterfeiters who now have far better equipment to work with than ever before.

Australian Patent No. 488,652 to Hamann et al. recognized the need to defeat the ever-increasing use of photographic reproduction equipment for counterfeiting documents of value. Hamann et al. describes a security token comprising a laminate of at least two layers of plastic sheeting bonded together wherein an optically variable device is enclosed between the layers. However, the token described by Hamann et al. fails to provide two layers of paper which are bonded on each side of a thin plastic film as described by the instant invention. Instead, Hamann et al. teaches top and bottom layers of plastic film, preferably of transparent material, which are laminated to a paper or plastic material bearing printed indicia or other optical device. Thus, Hamann et al. teaches a well known lamination technique for security purposes similar to the lamination of a driver's license. No teaching exist for the production of a durable paper-like document which maintains the look and feel of conventional paper currency.

SUMMARY OF THE INVENTION

It is the object of the instant invention to produce a security document or currency which acts and feels like existing paper currency, but which exhibits unique and powerful anti-counterfeiting features compared to those on the market.

It is further the object of the present invention to create a document/currency substrate that would increase the average lifespan of the currency in circulation thereby reducing overall document/currency costs.

It is also the object of the present invention to provide a cost effective optically variable device and/or light transmittive metalization media as an integral part of the currency.

DETAILED DESCRIPTION OF THE PREFERRED EMBODIMENT

The act of laminating a paper document with a plastic covering to provide protection for the fragile paper is well known, but no teaching exists which attempts to create a paper-like security document by laminating two paper sheets to either side of a thin plastic or other durable, optical carrying substrate as taught by the present invention.

Figure 1:
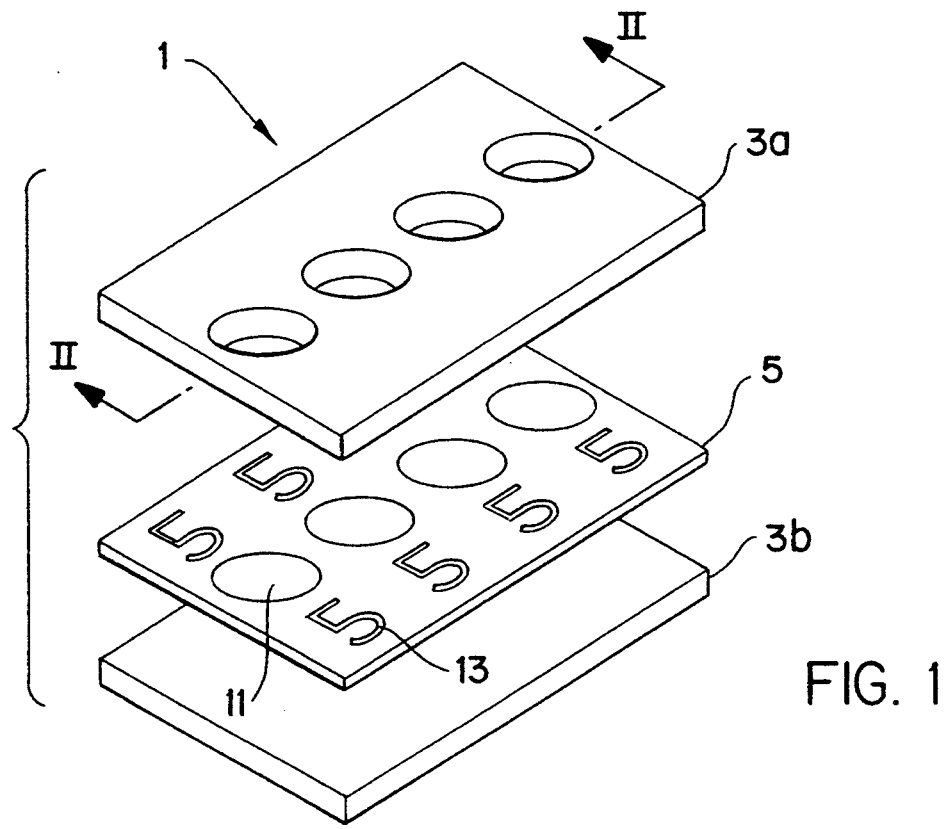
FIG. 1 is an exploded view of the laminated document of the instant invention.

With reference to FIG. 1, the document 1 of the instant invention is produced by laminating a top sheet 3a and a bottom sheet 3b of document/currency paper to a thin substrate, preferably plastic film 5, thereby forming a sandwich. The total thickness of the resulting article, i.e. the sandwich, is about the same thickness as existing currency; typically about 1/4000".

The laminate arrangement is the feature which will cause the document 1 to last significantly longer than ordinary paper currency. The major cause for rejection or termination of currency is that it eventually becomes limp. The thin plastic film 5, which becomes the center part of the sandwich, resists becoming limp, thus extends the life of the document 1.

A wide variety of durable substrate materials may be employed in practicing the present invention. For the sake of easy working and ready bonding, thermoplastic material is preferably employed, but is not essential. Thermosetting film-forming polymers may be used but do not possess the preferred flexibility. Various epoxy resins may be employed whereas thermo-plastic sheeting produced from plastics materials such as polyacrylates, polyvinyl chlorides, cellulose acrylates, polyolefins, polyethylene terathalates and cellulose acetates have been found to be suitable for the production of flexible substrates. It should be noted, however, that the substrate of the present invention is not limited to synthetic plastic materials, but rather encompasses any material having a durability greater than currency paper, and in which various security features may be incorporated for added anti-counterfeiting properties. For example, a thin metallic foil may serve as the substrate 5 to which the two paper sheets 3a, 3b are secured to form the improved currency of the instant invention.

In addition to adding durability to the document 1, the substrate film 5 also serves as the "carrier" which allows various security features to be incorporated into the currency for added anti-counterfeiting properties. The document 1 of the present invention is arranged in such a way that the optically variable device is protected from the hostile environment in which the document circulates. As shown in FIG. 1, the thin plastic film 5 is capable of serving at least a two-fold carrier function; the thin plastic film may carry both an optical media 11 (hologram, kinegram, pixelgram, etc.) and/or a metalized media, i.e. numbers or logos 13.

There are several methods of applying the micro image security feature 11 (hologram, kinegram, multiple diffraction grating, etc.) to the surface of the film 5. For example, the image 11 can be embossed into an already metalized film 5 or embossed into the clear film 5. The image 11 may also be cast into the film 5 using the typical U.V. or electron beam curing systems. It should be understood that addition methods may be utilized for applying the optical security features.

Figure 2:
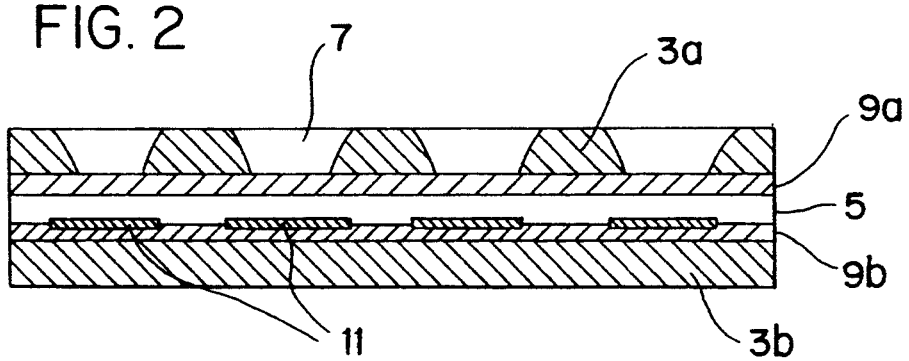
FIG. 2 is a cross sectional view of the document of the present invention taken along section lines II—II of FIG. 1.

With reference to FIG. 2, a bill 1 is formed as shown whereby a bottom sheet 3b is secured to the thin substrate film 5 by an adhesive layer 9b. Moreover, the top sheet 3a is secured to the opposite side of the thin film 5 with respect to the bottom sheet 3b by an adhesive layer 9a. The preferred adhesives which permanently marry the film 5 to the currency paper 3a, 3b have recently been developed and are now on the market. In the preferred embodiment of the present invention, the top sheet 3a is also provided with windows or holes 7 through which the optical device(s) 11 may be viewed.

There are two preferred methods for creating the window(s) 7 in a sheet of paper which will be laminated over the optically variable device 11. The first method is to laminate the two sheets of paper 3a, 3b to the thin film 5 by a preferred adhesive. The paper 3a is then ground in specific areas with a paper grinder up to, but not through the adhesive layer 9a covering the optical device. Since the adhesive layer 9a is clear, one will be able to see the optically variable device 11 through the thin film of adhesive. The adhesive layer also serves the additional purpose of further protecting the optically variable device 11. As shown on FIG. 2, the optical image 11 is preferably provided on that side of the film 5 opposite the hole 7, thus further protecting the optical device 11 from wear.

The second method of providing the window(s) 7 consists of grinding or punching the holes 7 in the appropriate paper sheet 3a, 3b which will serve to cover the optically variable device 11 prior to lamination. In the preferred methods described above, the adhesive is coated upon the paper sheet before the holes 7 are punched or grounded. Further, the optically variable device 11 carried by the film 5 is preferably larger than the hole 7, thus ensuring that even if the location or registration of the holes 7 is offset, the optically variable device 11 will still be seen through the corresponding hole. It should be noted that the inclusion of windows 7 as described above is not limited solely to the top sheet 3a or bottom sheet 3b, but may encompass the inclusion of windows in either sheet or both.

It should be understood that, for the pre-punching method described above, the appropriate sheet is laminated in register to the imaged center plastic sheet 5. This will be accomplished through existing "insetter" register controls or other suitable means.

As previously mentioned, the thin plastic center film 5 may carry a metalized media capable of being seen in transmitted light to further enhancing the security capabilities of the instant invention. There are two methods of creating reflective or refractive metalized coating on the film 5; these are the additive method and the subtractive method. In the additive method, the optically variable device 11, for instance, is selectively metalized in predetermined areas; thus the device is made reflective or refractive. In the subtractive method, the reflective surface is laid on the entire film 5, and thereafter, demetalized except in the areas where the security device is wanted. Therefore, the film 5 may be metalized to show different colors in transmitted and reflected light or to show a pattern in transmitted light only. The metalization of the film 5 is easily accomplished yet difficult to simulate without expensive equipment and sophisticated technology.

The security document or currency 1 of the present invention is formed by laminating the film 5 between two layers of banknote or currency paper 3a, 3b which will be printed, in due course, in the known manner of currency printing.

The instant invention provides an additional advantage in the effort to stem the counterfeiting process. There exists a form of pseudo counterfeiting whereby a $20 bill, for example, is "split" with great care such that the resulting paper sheets are maintained in usable condition. The "split" $20 bill is then married to a "split" $1 bill to create two $20 bills. Thus, for $21 the counterfeiter, or as more properly phrased, the alterer, has created two $20 bills.

Using the method of the present invention, the alterer would have to split from the laminate surface a bill half the depth of the existinng bill, and from the back a similar piece of paper half the ordinary thickness. The alterer would then be left with an extremely thin "note" which would be noticeable by people to whom the counterfeit document is passed. The present invention, therefore, effectively eliminates this additional counterfeiting technique.

As described above, the film 5 may be the carrier of a metallic hologram or diffraction grating and/or a spot metalized image. It is also possible to cast the hologram and thereafter metalize the entire film and demetalize only those areas which one wishes to maintain as metalized.

It is also possible to metalize an area other than the hologram (or print these areas), so that the completed paper will have transmissive features (images) in predetermined areas when held up to a light source. This feature is illustrated as metalized numbers 13 in FIG. 1.

It should also be noted that the optical media is provided on that side of the film 5 opposite the hole 7 as shown in FIG. 2. Therefore, the hologram surface is further protected against wear.

The act of laminating a paper document with a plastic covering to provide protection for the fragile paper is well known, but no teaching exists which attempts to create a paper-like security document by laminating two paper sheets to either side of a thin plastic, optical carrying substrate as taught by the present invention.

While the present invention has been particularly shown and described with reference to a preferred embodiment, it will be understood by those having ordinary skill in the art that various changes in form and detail may be made therein without departing from the spirit and scope of the invention.

I claim:

1. A method of making an anti-counterfeiting document comprising the steps of:
   forming a flexible thin middle substrate having a first and second surface from a material different from and having a durability greater than paper;
   forming an optical image on said thin middle substrate;
   securing a first outer part to said first surface of said thin middle substrate, said first outer part being paper;
   securing a second outer part to said second surface of said thin middle substrate, said second outer part being paper; and providing at least one aperture in at least one of said first outer part and said second outer part through which said optical image formed on said middle substrate is exposed.

2. A method as recited in claim 1, wherein said optical image comprises a hologram.

3. A method as recited in claim 1, wherein said optical image comprises a kinegram.

4. A method as recited in claim 1, wherein said optical image comprises multiple diffraction grating.

5. A method as recited in claim 1, wherein each of said securing steps comprises an introduction of an adhesive layer between said first and second outer parts and said middle substrate.

6. A method as recited in claim 1, wherein the step of providing apertures is performed after said first and second outer parts are secured to said middle substrate.

7. A method as recited in claim 6, wherein the step of providing apertures comprises grinding specific areas of said first and second parts.

8. A method as recited in claim 1, wherein the step of providing apertures comprises locating said apertures before said steps of securing said first and second outer parts.

9. A method as recited in claim 1, wherein said apertures are provided in the outer part on that side of said middle substrate opposite the optical image.

10. A method as recited in claim 1, further comprising the step of providing a metalized media on said thin middle substrate, said metalized media having a different appearance in reflected or transmitted light.

11. A method as recited in claim 1, further comprising the step of printing on said document.

12. A method as recited in claim 11, wherein said step of printing on said document is performed after said first and second outer parts are secured to said middle substrate.

13. A method as recited in claim 1, wherein said substrate comprises a polymer material.

14. A method as recited in claim 13, wherein said polymer material is plastic.

15. A method as recited in claim 1, wherein said substrate comprises a metallic foil.

16. An anti-counterfeiting document comprising:
a thin middle substrate having a first and second surface, said substrate being formed from a material different from and having a durability greater than paper, and comprising an optical image formed thereon;
a first outer part secured to said first surface of said thin middle substrate, said first outer part being paper;
a second outer part secured to said second surface of said thin middle substrate, said second outer part being paper; and
at least one aperture provided in at least one of said first outer part and said second outer part through which said optical image formed on said middle substrate is exposed.

17. The anti-counterfeiting document recited in claim 16 wherein said optical image comprises a hologram.

18. The anti-counterfeiting document recited in claim 16 wherein said optical image comprises a kinegram.

19. The anti-counterfeiting document recited in claim 16 wherein said optical image comprises multiple diffraction grating.

20. The anti-counterfeiting document recited in claim 16, further comprising adhesive layers between said outer parts and said middle substrate, said adhesive layers securing said outer parts to said middle substrate.

21. The anti-counterfeiting document recited in claim 16, wherein said at least one aperture is provided in said outer part on that side of said middle substrate opposite said optical image.

22. The anti-counterfeiting document recited in claim 16, wherein said substrate comprises a polymer material.

23. The anti-counterfeiting document recited in claim 22, wherein said polymer material is plastic.

24. The anti-counterfeiting document recited in claim 16, wherein said substrate comprises a metallic foil.

25. An anti-counterfeiting document comprising:
a thin middle substrate having a first and second surface, said substrate being formed from a material different from and having a durability greater than paper;
a first outer part secured to said first surface of said thin middle substrate, said first outer part being paper;
a second outer part secured to said second surface of said thin middle substrate, said second outer part being paper;
wherein a metalized media is provided on said thin middle substrate, said metalized media having a different appearance in reflected or transmitted light; and
at least one aperture provided in at least one of said first outer part and said second outer part through which said middle substrate is exposed.

* * * * *